United States Patent [19]

Urabe et al.

[11] Patent Number: 5,100,840

[45] Date of Patent: Mar. 31, 1992

[54] METHOD OF PREPARING A BRIQUETTE BATCH

[75] Inventors: Yuichi Urabe; Masanobu Kobayashi, both of Osaka, Japan

[73] Assignee: Nippon Sheet Glass Co., Ltd., Osaka, Japan

[21] Appl. No.: 643,896

[22] Filed: Jan. 22, 1991

[30] Foreign Application Priority Data

Jan. 31, 1990 [JP] Japan .................................. 2-21600

[51] Int. Cl.⁵ .......................... C03C 6/10; C03C 6/08; C03C 6/04; C04B 35/00
[52] U.S. Cl. ........................................ 501/27; 501/28; 501/29; 501/31; 501/70; 501/154; 501/155; 106/772
[58] Field of Search ...................... 501/11, 14, 17, 21, 501/27, 28, 29, 31, 32, 70, 154, 155; 106/772

[56] References Cited

U.S. PATENT DOCUMENTS 4,248,615  2/1981  Seng et al. .............................. 65/27
4,778,523  10/1988  Tomari et al. ......................... 75/256

OTHER PUBLICATIONS

Ceramic Industry "Raw Materials Handbook", Jan. 1986, vol. 26, No. 1, P. 115.

Primary Examiner—William R. Dixon, Jr.
Assistant Examiner—Michael A. Marcheschi
Attorney, Agent, or Firm—Kanesaka and Takeuchi

[57] ABSTRACT

A briquette batch is prepared from a mixture of glass raw materials containing not only sodium hydroxide as a binder, but also calcined plaster.

5 Claims, No Drawings

METHOD OF PREPARING A BRIQUETTE BATCH

BACKGROUND OF THE INVENTION

1. Field of the Invention

This invention relates to a method of preparing a briquette batch. More particularly, it is concerned with a method of preparing a briquette batch for making a briquette which has a high green crushing strength, can increase its crushing strength rapidly, and exhibits a very high dry crushing strength.

2. Related Art Statement

It is usual to preheat raw materials by recycling waste gas of a glass melting tank furnace to save heat energy which is required. The materials which are pre-heated are usually in the form of a briquette batch made by compacting granular materials. The batch usually comprises a mixture having the composition shown below, and prepared by using one or more of water, sodium hydroxide and water glass as a binder:

Composition of the Mixture (wt. %)

| Composition of the Mixture (wt. %) | |
|---|---|
| Silica sand | 60 to 65 |
| Dolomite | 11 to 18 |
| Soda ash | 16 to 18 |
| Limestone | 2 to 10 |
| Glauber's salt | 0.7 to 1.0 |
| Carbon | About 0.02 |

The binder is usually employed in the amount ranging from 10 to 20% by weight of the total alkali content of the raw materials if it contains sodium hydroxide and water glass, while the raw materials have a water content of 5 to 10% by weight.

The briquette batch which has been prepared from those materials and binder, however, has a low green crushing strength, fails to increase its crushing strength rapidly when heated, and exhibits, therefore, only a low dry crushing strength. The briquette batch having a low green crushing strength is broken immediately after its preparation and the conventional preparation of the batch has only been possible at a low yield. The batch having a low dry crushing strength is difficult to handle when it is fed in a glass melting tank furnace. Thus, it has hither-to been difficult to prepare and preheat any briquette batch efficiently and economically.

SUMMARY OF THE INVENTION

Under these circumstances, it is an object of this invention to provide a method of preparing a briquette batch comprising a mixture of glass raw materials which has a high green crushing strength, can increase its crushing strength rapidly, and exhibits a high dry crushing strength.

This object is attained by a method of preparing a briquette batch from glass raw materials by using sodium hydroxide as a binder, to which calcined plaster is also added.

The conventional briquette batch prepared by using sodium hydroxide as a binder owes its strength mainly to the amount of $Na_2CO_3$ resulting from the following reaction, and the amount of water vaporizing from the batch.

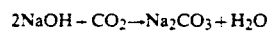

This reaction, however, takes a long time, as air in which it is carried out contains only a limited amount of $CO_2$. The reaction yields only a briquette batch which has a low green crushing strength, and fails to attain any satisfactorily high crushing strength in a short time.

On the other hand, the method of this invention employs calcined plaster in addition to sodium hydroxide. It is considered that calcined plaster undergoes the following reaction, and that the reaction product thereof and the reaction product of sodium hydroxide as hereinabove shown cooperate in the formation of a briquette batch which has a high green crushing strength, can increase its crushing strength rapidly, and exhibits a high dry crushing strength:

DETAILED DESCRIPTION OF THE INVENTION

The method of this invention is characterized by adding calcined plaster and sodium hydroxide to a mixture of raw materials for preparing a briquette batch and is otherwise equal to the known method.

When the method of this invention is used for preparing a briquette batch from a mixture of raw materials which is usually employed for making plate glass, calcined plaster is added in the amount not exceeding both the amounts of calcium and sulfur which the mixture of raw materials contains. It is usually preferable that calcined plaster be added in the amount giving a ratio of substitution ranging from 6 to 13% by weight (in terms of CaO) for the total CaO content of the raw materials. If the ratio is lower than 6% by weight, it is impossible to obtain a briquette batch which can increase its crushing strength rapidly. If it exceeds 13% by weight, glass has too high content of $SO_3$ to maintain any generally acceptable soda lime composition.

Sodium hydroxide is preferably added in the amount giving a ratio of substitution ranging from 10 to 20% by weight (in terms of $Na_2O$), and more preferably in the vicinity of 15% by weight, for the total $Na_2O$ content of the raw materials. If the ratio is lower than 10% by weight, there is obtained a briquette batch having a very low crushing strength at elevated temperatures, though it has a high green crushing strength. If it exceeds 20% by weight, there is obtained an uneconomical briquette batch which requires a large amount of heat and a relatively long period of time for increasing its strength at elevated temperatures.

It is usually preferable that the method of this invention be carried out by employing a mixture of raw materials having the composition shown below.

Composition of the Mixture (wt. %)

| Composition of the Mixture (wt. %) | |
|---|---|
| Silica sand | 57 to 65 |
| Dolomite | 11 to 18 |
| Limestone | 2 to 10 |
| Calcined plaster | 0.5 to 1.0 |
| Soda ash | 16 to 18 |
| Glauber's salt | 0.5 to 1.2 |
| Calumite | 0.3 to 0.8 |
| Carbon | 0 to 0.1 |
| NaOH | 4.0 to 5.0 |
| Water | 3.0 to 10.0 |

The materials may be mixed in the following order:

Silica sand - NaOH - water - dolomite - limestone + calcined plaster - soda ash - Glauber's salt + carbon — Calumite The Calumite is a trade name of slag of a blast furnace sold by The Calumite Company and Calumite International U.S.A., which has the following composition:

| CaO | 42.13% |
|---|---|
| Al$_2$O$_3$ | 14.64% |
| SiO$_2$ | 33.75% |
| MgO | 6.98% |
| S | 0.77% and |
| Fe$_2$O$_3$ | 0.321% |

Other orders or ways can, of course, be adopted to mix the materials. For example, silica sand and NaOH are first mixed and all of the remaining materials are then mixed together with the mixture of silica sand and NaOH.

The mixture of the materials may be processed in a customary way by a briquetting machine to provide a briquette batch which acquires a high crushing strength rapidly.

The method of this invention enables the preparation of a briquette batch having a very high green crushing strength and a greatly improved dry crushing strength which is very unlikely to break immediately after its preparation and is also easy to handle after drying. It enables the improved yields of green and dry briquette batches and ensures the efficient preparation, and preheating of briquette batches.

The invention will now be described more specifically with reference to a few examples.

EXAMPLES 1 AND 2 AND COMPARATIVE EXAMPLES 1 AND 2

Sodium hydroxide and (or) calcined plaster were added to a mixture of raw materials having the composition shown in TABLE 1 to give the ratio of substitution as shown in TABLE 2. More specifically, calcined plaster was added so as to occupy 0 to 13.0% by weight of the total CaO content of the mixture of raw materials which contained 7% by weight of CaO. The amounts of sulfur and sodium were adjusted by controlling the amounts of other materials.

TABLE 1

| Material | Wt. % |
|---|---|
| Silica sand | 58.0 |
| Dolomite | 16.0 |
| Limestone | 2.0 |
| Soda ash | 17.0 |
| Glauber's salt | 1.0 |
| Carbon | 0.05 |
| Calumite | 0.6 |
| Water | 5.4 |

The raw materials were mixed in the following order:
Silica sand - NaOH - water - dolomite - limestone +calcined plaster - soda ash - Glauber's salt +carbon +Calumite Each mixture was processed in a briquetting machine to prepare a briquette batch. The briquette batch was examined for its green crushing strength and also for its crushing strength after 10 minutes of drying at 200° C. The results are shown in TABLE 2. Five dry briquette batches which had been prepared from each mixture were shaken in a 5-mesh sieve for 10 minutes and the dust which had passed through the mesh openings of the sieve was weighed. The results are shown in TABLE 2.

TABLE 2

| | Example | | Comparative Example | |
|---|---|---|---|---|
| | 1 | 2 | 1 | 2 |
| Ratio of substitution (wt. %) | | | | |
| NaOH*$^1$ | 15 | 15 | 15 | 0 |
| Calcined plaster*$^2$ | 6 | 13 | 0 | 13 |
| Green crushing strength (kg) | 16.3 | 17.6 | 10.7 | 39.8 |
| Dry crushing strength (kg) | 45.6 | 43.0 | 36.6 | 12.0 |
| Dust (wt. %) | 2.3 | 4.8 | 5.5 | 66.3 |

*$^1$For the total Na$_2$O content of the mixture;
*$^2$For the total CaO content of the mixture.

As is obvious from TABLE 2, the briquette batches according to EXAMPLES 1 and 2, which had been prepared from the mixtures containing both calcined plaster and NaOH, showed both a high green crushing strength and a high dry crushing strength. On the other hand, the briquette batch according to COMPARATIVE EXAMPLE 1, which had been prepared from the mixture not containing calcined plaster, was not satisfactory in green or dry crushing strength. The briquette batch according to COMPARATIVE EXAMPLE 2, which had been prepared from the mixture containing calcined plaster, but not containing NaOH, showed a very high green crushing strength, but formed a large amount of dust as a result of dehydration when it was dried.

We claim:

1. A method of preparing a briquette batch, comprising mixing glass raw materials of 57 to 65% by weight of silica sand, 11 to 18% by weight of dolomite, 2 to 10% by weight of limestone, 0.5 to 1.0% by weight of calcined plaster, 16 to 18% by weight of soda ash, 0.5 to 1.2% by weight of Glauber's salt, 0.3 to 0.8% by weight of Calumite, 0 to 0.1% by weight of carbon, 4.0 to 5.0% by weight of sodium hydroxide, and 3.0 to 10.0% by weight of water, said sodium hydroxide being added as a binder.

2. A method as set forth in claim 1, wherein said calcined plaster is added so as to occupy 6 to 13% by weight of the total CaO content of said mixture.

3. A method as set forth in claim 1, wherein said sodium hydroxide occupies 10 to 20% by weight of the total Na$_2$O content of said mixture.

4. A method as set forth in claim 1, wherein said silica sand and sodium hydroxide are firstly mixed together, to which water is added, and lastly all other remaining materials are added to the mixture.

5. A method as set forth in claim 1, wherein said calcined plaster and sodium hydroxide operate to improve green crushing strength, dry crushing strength and dust formation in the briquette batch.

* * * * *